United States Patent [19]
Mechtersheimer

[11] Patent Number: 5,926,498
[45] Date of Patent: Jul. 20, 1999

[54] MELTING FURNACE FOR THE THERMAL TREATMENT OF SPECIAL WASTE MATERIALS CONTAINING HEAVY METAL AND/OR DIOXIN

[75] Inventor: Günter Mechtersheimer, Brugg, Switzerland

[73] Assignee: ABB Research Ltd., Zurich, Switzerland

[21] Appl. No.: 08/667,816

[22] Filed: Jun. 20, 1996

[30] Foreign Application Priority Data

Jul. 3, 1995 [DE] Germany .................. 195 24 215

[51] Int. Cl.⁶ .................................. F27D 17/00
[52] U.S. Cl. .................. 373/9; 373/2; 373/8; 373/32
[58] Field of Search ................. 373/2, 8, 9, 31, 373/32, 33, 34, 35, 41; 65/134

[56] References Cited

U.S. PATENT DOCUMENTS

| 1,944,855 | 1/1934 | Wadman | 373/31 |
| 2,331,052 | 10/1943 | Shadduck | 373/31 |
| 2,680,772 | 6/1954 | Skinner et al. | 373/32 |
| 4,882,736 | 11/1989 | Pieper | 373/32 |
| 4,932,035 | 6/1990 | Pieper | 373/32 |
| 5,574,746 | 11/1996 | Ammon et al. | 373/9 |

FOREIGN PATENT DOCUMENTS

| 0313902 | 5/1989 | European Pat. Off. |
| 0359931 | 3/1990 | European Pat. Off. |
| 0487770 | 6/1992 | European Pat. Off. |
| 0633441 | 1/1995 | European Pat. Off. |
| 3827086 | 2/1990 | Germany |
| 4039801 | 8/1991 | Germany |
| 4322448 | 1/1995 | Germany |

OTHER PUBLICATIONS

"Die thermische Reststoffbehandlung nach dem Deglor—Verfahren", Jochum, et al., Seminar, Technical Akademmmie Esslungen, May 1991, in Sarnen, Switzerland.

Primary Examiner—Tu Ba Hoang
Attorney, Agent, or Firm—Burns, Doane, Swecker & Mathis, L.L.P.

[57] ABSTRACT

A melting furnace for the thermal treatment of special waste materials containing heavy metal and dioxin is provided. The melting furnace includes a main furnace vessel, the main furnace vessel having a melting end for receiving a melt, and a gas chamber above the melt. The melting furnace further includes at least one charging device for supplying a product to be treated, at least one gas outlet, and at least one discharge chamber, the at least one discharge chamber being separated from the main furnace vessel by a separating wall and being connected to the melting end by a siphon, the at least one discharge chamber having a gas chamber above the melt. At least one first heater projects into an interior of the main furnace vessel, and at least one second heater is provided in the at least one discharge chamber. The separating wall includes at least one opening above a level of the melt, the at least one opening defining a free connection of the gas chamber of the at least one discharge chamber to the gas chamber of the main furnace vessel.

24 Claims, 2 Drawing Sheets

MELTING FURNACE FOR THE THERMAL TREATMENT OF SPECIAL WASTE MATERIALS CONTAINING HEAVY METAL AND/OR DIOXIN

BACKGROUND OF THE INVENTION

1. Field of the Invention

The invention relates to a melting oven for the thermal treatment of special waste materials containing heavy metal and/or dioxin, comprising a furnace vessel which has a melting end to receive a melt, at least one charging device for the supply of the product to be treated, at least one gas outlet, at least one discharge chamber which is separated from the charging device by a separating wall and is connected in a gastight manner to the melting end by means of a siphon, at least one first heater projecting into the interior of the furnace vessel, and at least one second heater in the discharge chamber.

A melting oven of this design is known, for example, from the European Patent Application with the publication number 0 633 441 or the U.S. Pat. No. 5,574,746 of the same content.

2. Discussion of Background

During the separation of toxic, volatile chemical compounds from a mixture of solid particles, electrostatic filter dust from industrial combustion plants with pollutants which are harmful to the environment, such as for example heavy metals and their compounds, is heated in a melting furnace to over 1400° C. The toxic chemical compounds and elements which evaporate during the process are removed from the melting furnace via an extractor, condensed and discharged. The non-evaporated residue is melted down successively, and the melt is discharged continuously or intermittently from the reaction space and caused to solidify. For heating, electric heaters are provided in the gas chamber of the melting furnace. These heaters are separated from the furnace atmosphere by means of ceramic protective tubes.

In this case, the discharge frequently takes place from a separate discharge chamber which is connected in a gastight manner to the actual melting furnace by means of a siphon. This prevents toxic gases from passing into the discharge chamber and thus into the environment. Since in many of the waste materials to be treated it is unavoidable that substances which are still harmful are released even in the discharge chamber, a second gas outlet with a quench arranged correspondingly downstream is required there. In addition to the cost of the quench, a considerable proportion of the heat in the discharge chamber is lost through the gas outlet.

SUMMARY OF THE INVENTION

Accordingly, one object of the invention is to provide a novel melting furnace for the thermal treatment of special waste materials containing heavy metal and/or dioxin, in which the heat energy present in the discharge chamber can be utilized better and gas emissions in the discharge chamber can be conducted away in a simple and effective manner.

According to the invention, this object is achieved in that one or more openings are provided in the separating wall above the level of the melt, which openings produce a free connection between the main furnace vessel and the discharge chamber.

The invention obviates the need for a separate gas outlet in the discharge chamber with a downstream quench. The hot gases, which to a small extent still contain pollutant, are conducted into the main furnace vessel and leave the main furnace vessel through the (single) gas outlet together with the main waste-gas flow. Depending on the design of the furnace heater and the distribution of the heating output to the main furnace vessel and the discharge chamber, a heater in the upper part of the main furnace vessel can even be dispensed with, or fewer or less powerful heating elements can be used there. A useful side effect of this "additional heating" consists in the fact that the heating elements which project regularly from the furnace ceiling into the vessel interior are no longer subjected only to the extremely aggressive gases and vapors released from the melt, but are also swept over by more inert, i.e. less aggressive, gases and vapors from the discharge chamber, which positively influences the service life of the heating elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
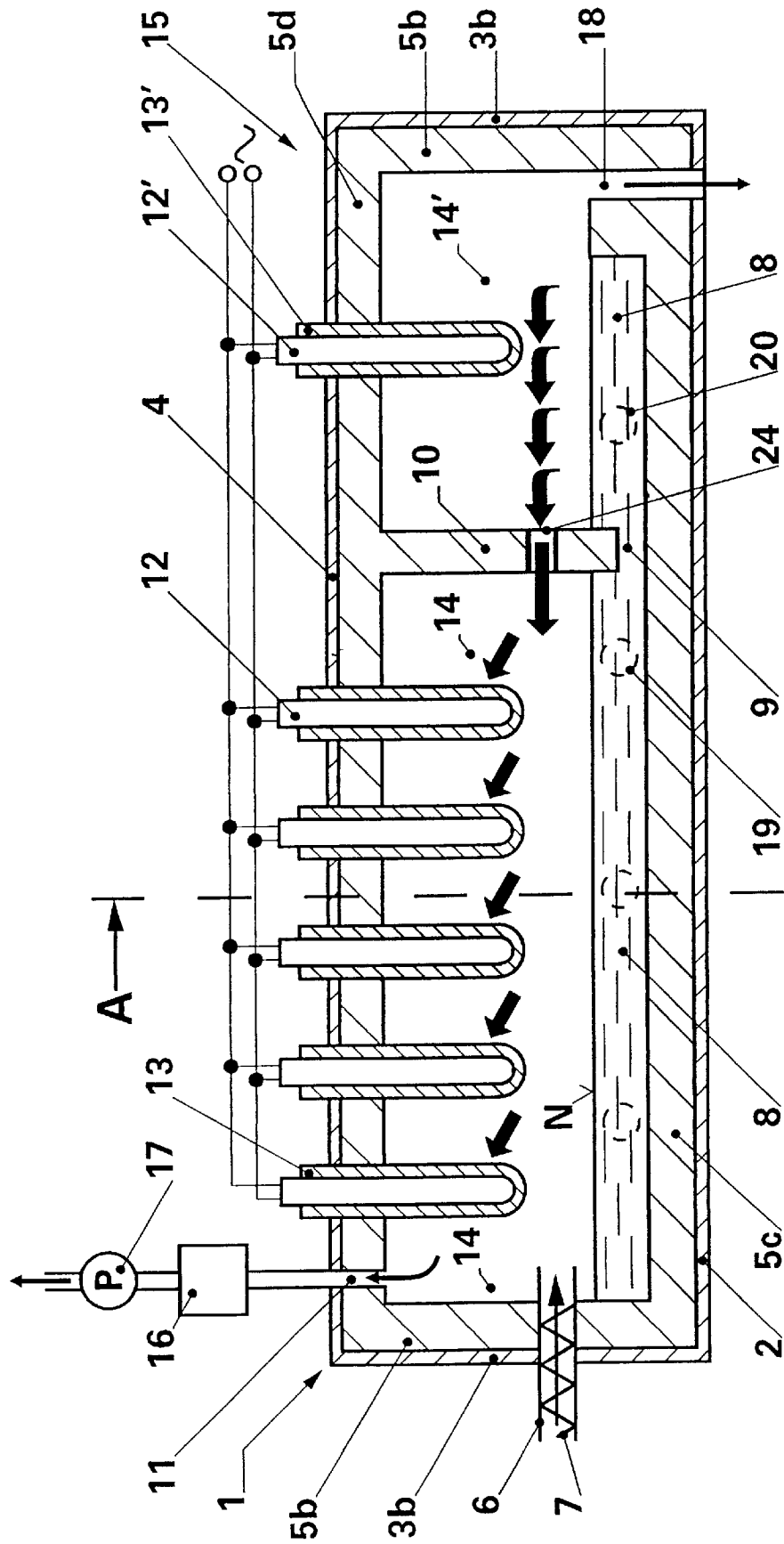
FIG. 1 shows a longitudinal section through a melting furnace, comprising a main furnace vessel and a discharge chamber.
Figure 2:
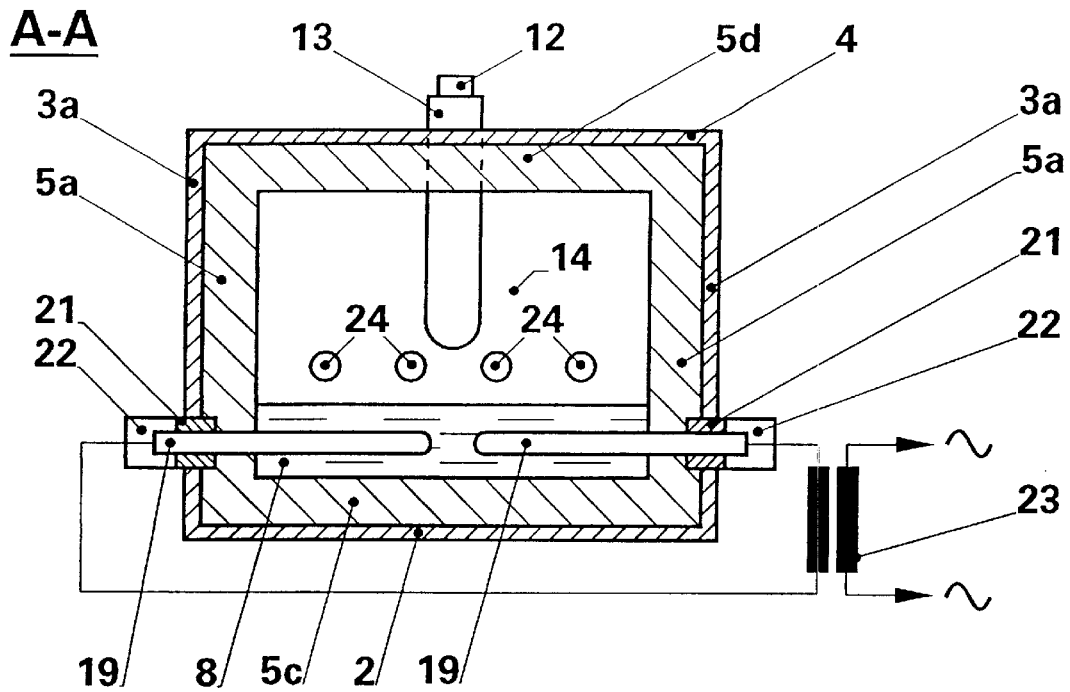
FIG. 2 shows a cross section through the melting furnace according to FIG. 1 along its line AA.
Figure 3:
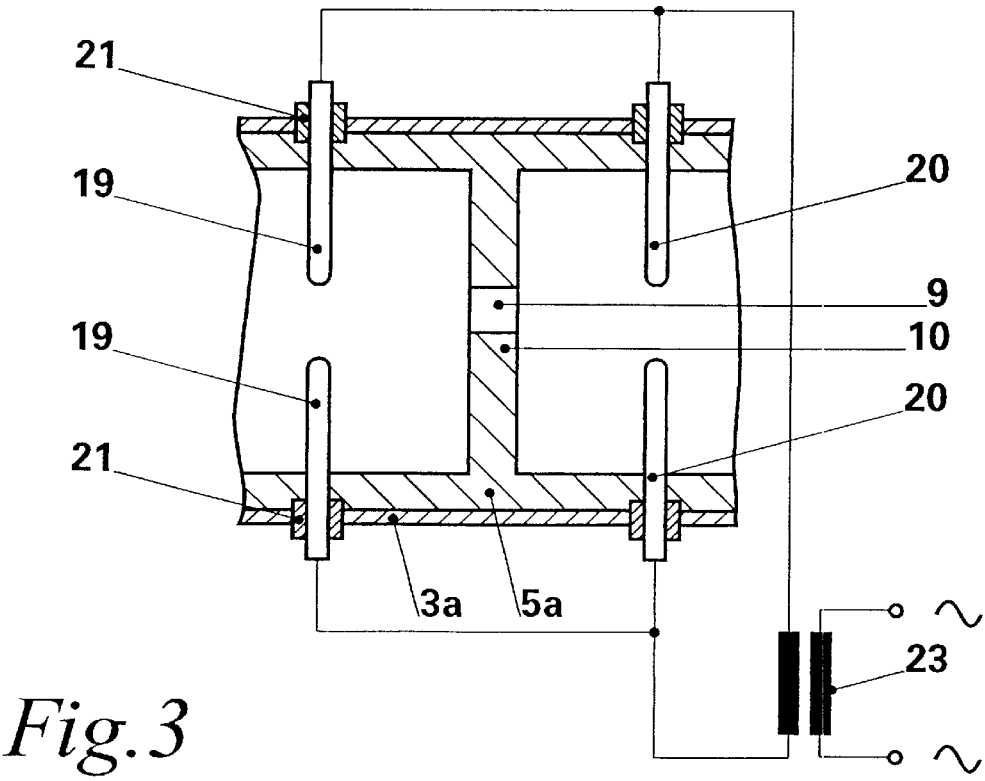
FIG. 3 shows a simplified diagram which shows the arrangement of the bath electrodes and their supply of electricity.

Referring now to the drawings, wherein like reference numerals designate identical or corresponding parts throughout the several views, in FIGS. 1, 2 and 3 of the drawing 1 denotes a main furnace vessel. In a metal housing, the bottom wall 2, side walls 3a, 3b and ceiling 4 with a brick lining 5 with side walls 5a, 5b and bottom 5c and ceiling 5d are made of fire-resistant material, such as is used, for example, in the construction of glass melting furnaces. The lower part of the vessel interior forms the melting end. The filter dust to be treated is supplied to the melting end via an inlet 6 by means of a feed device, e.g. a screw conveyor 7, at one end face of the furnace. The melt 8 leaves the actual furnace through a siphon 9 at the opposite end face 10 of the main furnace vessel, which end face extends, for this purpose, almost down to the bottom 5c apart from a passage 9. In this case, the level N of the melt lies below the screw conveyor 7 and above the passage 9. It then passes from the discharge chamber 15 through an overflow 18 into the atmosphere. The volatile substances released or converted due to the thermal treatment leave the furnace via a gas outlet 11 (FIG. 2) which is arranged in the upper region in the ceiling 4 on the inlet side of the main furnace vessel 1. They are cooled down abruptly in a quench 16. In this case, a suction pump 17 produces the necessary gas flow.

A first heater in the form of electric heating elements 12 which are sheathed by protective tubes 13 on a ceramic basis projects into the gas chamber 14 of the main furnace vessel 1 from above without dipping into the melt 8. The melt 8 is heated by additional heating elements 19, 20. For this additional heating, bath electrodes 19, 20 are provided in the side wall 5a both of the main furnace 1 and of the discharge chamber 15, which are arranged comparatively closely above the furnace bottom 5c so that they are constantly covered by the melt. The bath electrodes—they preferably consist of molybdenum—are mounted in sleeves 21 so that they can be pushed on, they are exchangeable, and they are covered on the outside by caps 22 (cf. FIG. 2). In order to prevent oxidation of the hot molybdenum, the sleeves 21 are either liquid-cooled, or they are flushed with an inert gas. Power is supplied by a transformer 23 which is connected on the primary side to the ordinary alternating voltage supply.

A melting furnace, such as has been described above, the method for its operation, the processes occurring in the furnace, and the further treatment of the volatile substances leaving the furnace via the gas outlet 11 are the subject-matter of EP-A-0 3 313 902 or EP-A-0 359 931, to which reference is expressly made here for the purpose of avoiding repetitions. On the occasion of the seminar on "Waste Incineration" of the Esslingen Technical Academy in Sarnen (Switzerland) on May 2 and 3 1991, a report by Messrs. J. Jochum, H. Jodeit and E. Schmidl entitled "The thermal residue treatment by the DEGLOR method" was furthermore distributed, which reported on a pilot plant in Hinwil (Switzerland) which operates according to the method mentioned at the beginning.

Since it can hardly be avoided in many of the waste materials to be treated that, albeit small, quantities of harmful gaseous or vaporous substances are released from the melt in the discharge chamber, it was considered to be essential also to provide a gas outlet in the discharge chamber with a downstream quench and/or filter. Apart from the additional construction outlay, heat losses result from a further gas outlet. In order to be able to make better use of the heating energy introduced into the discharge chamber 15, the invention provides for the gas chamber 14' of the discharge chamber 15 to be connected to the gas chamber 14 of the main furnace vessel by means of one or more openings 24 in the separating wall 10. These openings lie comparatively closely above the level N of the melt 8 in the region of the lower half, preferably in the lower third of the separating wall 10. The gaseous and vaporous substances released from the melt in the discharge chamber 15 are sucked through these openings 24 into the gas chamber 14 of the main furnace vessel 1. In the process, they flow around the electric heating elements 12. Since this gas flow is charged with less aggressive substances than that from the melt in the main furnace vessel, the protective tubes 13 of the heating elements 12 are subjected to less attack, their service life thus being increased.

The overall passage area of the openings 24 is. generally small compared to the area of the separating wall 10 (about 1–10%). It is determined essentially by the gas flow which is to be conducted away out of the discharge chamber 15 via the main furnace vessel. In order to minimize deposits in the openings 24 and reflux from the main furnace vessel, the flow velocity of the gas flow into said main furnace vessel should be greater than 1 m/s.

The differing aggressiveness of the gases and vapors released in the main furnace vessel 1 and in the discharge chamber furthermore permits more heat to be supplied to the discharge chamber than would be necessary for orderly discharge in order, with this additional heat, to assist the actual melting process and, in particular, the degasification of the special waste material introduced in the main furnace vessel. This also leads to lower loading of the heating elements 12 and, in particular, of their protective tubes 13 because they are subjected to lower thermal loading. This additional heat can, for example, be supplied by means of a relatively large number of bath electrodes 19 in the discharge chamber 15. Electric heating elements 12' with protective tubes 13' projecting from the ceiling into the gas chamber 14' or even gas burners (not included in the drawing) may also be provided there. Owing to the lower aggressiveness of the substances released in the discharge chamber 15, special protective tubes 13' may even be dispensed with, if appropriate, or protective tubes of lower quality may be used.

With the connection of the main furnace vessel 1 and discharge chamber 15 according to the invention in conjunction with an enforced heat supply to the discharge chamber 15, it is even possible to dispense with electric heating elements 12 in the gas chamber 14 of the main furnace vessel and to maintain the melting process there only by means of bath electrodes 19.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A melting furnace for the thermal treatment of special waste materials containing heavy metal and dioxin, comprising:

a main furnace vessel, the main furnace vessel having a melting end for receiving a melt, and a gas chamber above the melt;

at least one charging device for supplying a product to be treated;

at least one gas outlet located at an end of the main furnace vessel;

at least one discharge chamber, the at least one discharge chamber being separated from the main furnace vessel by a separating wall located at an opposite end of the furnace vessel and being connected to the melting end by a siphon, the at least one discharge chamber having a gas chamber above the melt;

at least one first heater projecting into an interior of the main furnace vessel; and at least one second heater in the at least one discharge chamber, wherein the separating wall includes at least one opening above a level of the melt, the at least one opening defining a free connection of the gas chamber of the at least one discharge chamber to the gas chamber of the main furnace vessel and arranged such that a directed gas flow produced in the at least one discharge chamber assists in a melting process as the flow passes over the substantially entire melt in the main furnace vessel to the at least one gas outlet.

2. The melting furnace as claimed in claim 1, wherein the first heater includes at least one heating element, and the at least one opening is arranged to permit the directed gas flow from the discharge chamber through the main furnace vessel to the gas outlet around the at least one heating element of the first heater.

3. The melting furnace as claimed in claim 1, wherein the at least one opening is disposed in a lower half of the separating wall.

4. The melting furnace as claimed in claim 1, further comprising at least one third heating element projecting into the gas chamber of the discharge chamber.

5. The melting furnace as claimed in claim 1, wherein the at least one opening is disposed in a lower third of the separating wall.

6. The melting furnace as claimed in claim 1, further comprising at least one third heating element projecting into the gas chamber of the discharge chamber, the at least one third heating element being in the form of a gas burner.

7. A melting furnace for the thermal treatment of special waste materials containing heavy metal, comprising:

a main furnace vessel, the main furnace vessel having a melting end for receiving a melt, and a gas chamber above the melt;

at least one charging device for supplying a product to be treated;

at least one gas outlet located at an end of the main furnace vessel;

at least one discharge chamber, the at least one discharge chamber being separated from the main furnace vessel by a separating wall located at an opposite end of the furnace vessel and being connected to the melting end by a siphon, the at least one discharge chamber having a gas chamber above the melt;

at least one first heater projecting into an interior of the main furnace vessel; and at least one second heater in the at least one discharge chamber, wherein the separating wall includes at least one opening above a level of the melt, the at least one opening defining a free connection of the gas chamber of the at least one discharge chamber to the gas chamber of the main furnace vessel and arranged such that a directed gas flow produced in the at least one discharge chamber assists in a melting process as the flow passes over the substantially entire melt in the main furnace vessel to the at least one gas outlet.

8. The melting furnace as claimed in claim 7, wherein the first heater includes at least one heating element, and the at least one opening is arranged to permit the directed gas flow from the discharge chamber through the main furnace vessel to the gas outlet around the at least one heating element of the first heater.

9. The melting furnace as claimed in claim 7, wherein the at least one heating element is disposed in a lower half of the separating wall.

10. The melting furnace as claimed in claim 7, further comprising at least one third heating element projecting into the gas chamber of the discharge chamber.

11. The melting furnace as claimed in claim 7, wherein the at least one opening is disposed in a lower third of the separating wall.

12. The melting furnace as claimed in claim 7, further comprising at least one third heating element projecting into the gas chamber of the discharge chamber, the at least one third heating element being in the form of a gas burner.

13. A melting furnace for the thermal treatment of special waste materials containing dioxin, comprising:

a main furnace vessel, the main furnace vessel having a melting end for receiving a melt, and a gas chamber above the melt;

at least one charging device for supplying a product to be treated;

at least one gas outlet located at an end of the main furnace vessel;

at least one discharge chamber, the at least one discharge chamber being separated from the main furnace vessel by a separating wall located at an opposite end of the furnace vessel and being connected to the melting end by a siphon, the at least one discharge chamber having a gas chamber above the melt;

at least one first heater projecting into an interior of the main furnace vessel; and at least one second heater in the at least one discharge chamber, wherein the separating wall includes at least one opening above a level of the melt, the at least one opening defining a free connection of the gas chamber of the at least one discharge chamber to the gas chamber of the main furnace vessel and arranged such that a directed gas flow produced in the at least one discharge chamber assists in a melting process as the flow passes over the substantially entire melt in the main furnace vessel to the at least one gas outlet.

14. The melting furnace as claimed in claim 13, wherein the first heater includes at least one heating element, and the at least one opening is arranged to permit the directed gas flow from the discharge chamber through the main furnace vessel to the gas outlet around the at least one heating element of the first heater.

15. The melting furnace as claimed in claim 13, wherein the at least one heating element is disposed in a lower half of the separating wall.

16. The melting furnace as claimed in claim 13, further comprising at least one third heating element projecting into the gas chamber of the discharge chamber.

17. The melting furnace as claimed in claim 13, wherein the at least one opening is disposed in a lower third of the separating wall.

18. The melting furnace as claimed in claim 13, further comprising at least one third heating element projecting into the gas chamber of the discharge chamber, the at least one third heating element being in the form of a gas burner.

19. The melting furnace as claimed in claim 1, wherein the melt includes hazardous waste materials containing heavy metal and dioxin.

20. The melting furnace as claimed in claim 7, wherein the melt includes hazardous waste materials containing heavy metal.

21. The melting furnace as claimed in claim 13, wherein the melt includes hazardous waste materials containing dioxin.

22. The melting furnace as claimed in claim 1, wherein the at least one first heater projects into the gas chamber of the main furnace vessel.

23. The melting furnace as claimed in claim 7, wherein the at least one first heater projects into the gas chamber of the main furnace vessel.

24. The melting furnace as claimed in claim 13, wherein the at least one first heater projects into the gas chamber of the main furnace vessel.

* * * * *